United States Patent
Sardo

(10) Patent No.: US 6,349,755 B1
(45) Date of Patent: Feb. 26, 2002

(54) SYSTEM FOR EVALUATING THE GEOMETRY OF ARTICLES TRANSPORTED BY A CONVEYOR

(75) Inventor: Stefano Sardo, Chateaurenard (FR)

(73) Assignee: Xeda International, Saint-Andiol (FR)

( * ) Notice: Subject to any disclaimer, the term of this patent is extended or adjusted under 35 U.S.C. 154(b) by 10 days.

(21) Appl. No.: 09/610,361

(22) Filed: Jul. 5, 2000

(30) Foreign Application Priority Data

Jul. 7, 1999 (FR) .............................................. 99 08798

(51) Int. Cl.[7] .............................. G01B 5/20; B07C 5/04; B32B 31/00; B44C 31/00
(52) U.S. Cl. ................. 156/360; 33/552; 156/DIG. 25; 156/362; 156/542; 209/586
(58) Field of Search ............................ 33/552, 501.02, 33/502, 556, 559; 156/360, 362, 363, 542, DIG. 1, DIG. 5, DIG. 25; 209/586, 587, 600, 601, 604, 592, 593, 645, 935

(56) References Cited

U.S. PATENT DOCUMENTS

| | | | | |
|---|---|---|---|---|
| 4,129,473 A | * | 12/1978 | Perret ........................... | 156/364 |
| 4,349,405 A | * | 9/1982 | Dudzik ......................... | 156/358 |
| 4,586,613 A | * | 5/1986 | Horii ............................ | 209/556 |
| 4,940,536 A | * | 7/1990 | Cowlin et al. ............... | 209/592 |
| 5,156,278 A | * | 10/1992 | Aaron et al. ................. | 209/556 |
| 5,184,733 A | * | 2/1993 | Arnarson et al. ............ | 209/585 |
| 5,315,879 A | * | 5/1994 | Crochon et al. ............. | 73/818 |
| 5,350,482 A | * | 9/1994 | Westbury ..................... | 156/566 |
| 5,723,797 A | | 3/1998 | Dimmick et al. ........... | 73/865.8 |
| 5,738,755 A | * | 4/1998 | Hartman ....................... | 156/566 |
| 5,820,714 A | * | 10/1998 | Lerner .......................... | 156/64 |
| 6,024,149 A | * | 2/2000 | Bernhard et al. ............ | 156/497 |

FOREIGN PATENT DOCUMENTS

| | | | |
|---|---|---|---|
| EP | 0 847 927 | 6/1998 | |
| FR | 982609 | 2/1965 | |
| FR | 2 723 327 | 2/1996 | |
| JP | 03085240 | * 4/1991 | ............ 156/DIG. 5 |

* cited by examiner

Primary Examiner—Diego Gutierrez
Assistant Examiner—Gail Verbitsky
(74) Attorney, Agent, or Firm—Wenderoth, Lind & Ponack, L.L.P.

(57) ABSTRACT

The system (14, 18) for evaluating the geometry of articles transported by a conveyor (12) includes a frame (20) adapted to be mounted facing the conveyor (12), feelers (22) carried by the frame and moved relative to the frame (20) by articles transported by the conveyor (12), each feeler (22) having an end (28) for tracking the exposed surface of an article, which tracking end (28) is adapted to rest on the article and to move the feeler (22) by an amount representative of the position of the point on the article to which the tracking end (28) of the feeler (22) is applied, means (32) for measuring the position of each feeler (22) relative to the frame (20), and means (18) for calculating the geometry of the articles according to the measured position of each feeler (22).

13 Claims, 2 Drawing Sheets

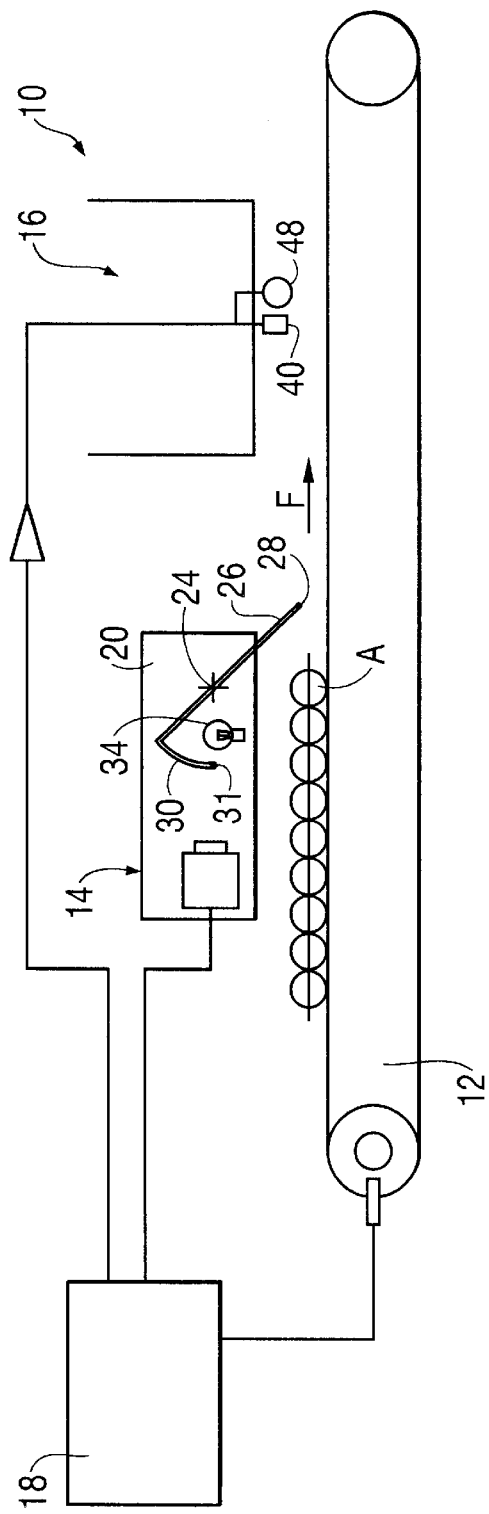
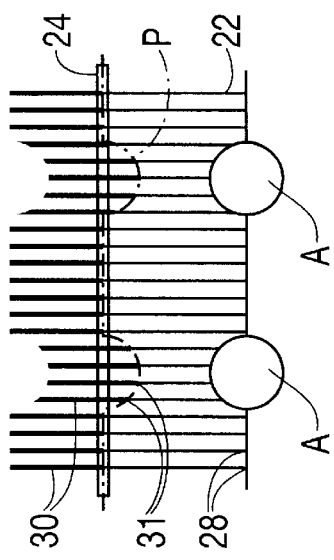
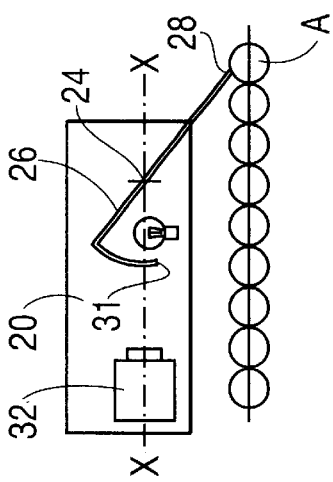
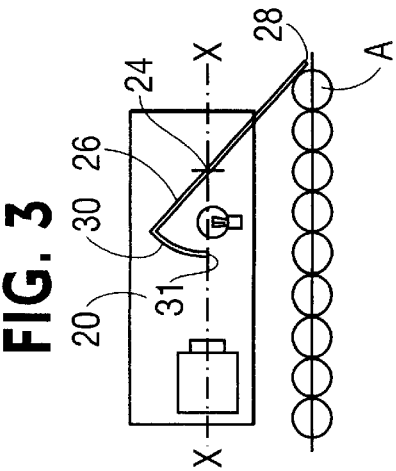

SYSTEM FOR EVALUATING THE GEOMETRY OF ARTICLES TRANSPORTED BY A CONVEYOR

The present invention concerns a system for evaluating the geometry of articles transported by a conveyor, such as fruit in a crate resting on a conveyor.

A system of the above kind is used in particular in an installation for automatically labelling fruit in crates.

In an installation of the above kind, crates containing fruit to be labelled travel on a conveyor belt that is driven continuously. The fruit is distributed over most of the surface of the crate with the individual fruits held side-by-side in a particular arrangement. To this end the individual fruits are received in adjacent cells disposed in rows and columns in the crate, for example.

Above the conveyor are successively disposed a system for evaluating the geometry of the fruit in the crates and a labelling system.

The labelling system includes labelling heads distributed transversely across the width of the conveyor. Each head is associated with one row of fruit in a crate. Accordingly, for satisfactory labelling, the labelling heads must be spaced by the distance between the rows of fruit in the crates.

To enable fruit of different sizes or differently arranged in the crates to be labelled, the transverse position of each labelling head relative to the conveyor is adjustable. The height of the labelling heads is also adjustable. The position of the labelling heads is adjusted by motor-drive means controlled by a central control unit. The position of the labelling heads is modified according to the geometry of the fruit in the crates.

In prior art installations the systems for evaluating the geometry of the fruit in the crates include one or more video cameras disposed above the conveyor. The cameras are adapted to produce images of the crates containing the fruit. They are connected to a central data processor unit using image processing algorithms to deduce the geometry of the fruit and their position in the crates from the images of the crates.

Such algorithms are .extremely complex and the resulting evaluation of the geometry is unreliable. It is extremely difficult to distinguish between the components of the crate and the fruit in the images of the moving crates.

Accordingly, the solutions currently known in the art are very costly, difficult to use and not very reliable.

The object of the invention is to propose a system for evaluating the geometry of articles which is simple to implement and which in particular requires less complex processing algorithms.

To this end, the invention provides a system for evaluating the geometry of articles such as fruit transported by a conveyor, characterized in that it includes:
a frame adapted to be mounted facing the conveyor,
at least one feeler carried by the frame and moved relative to the frame by articles transported by the conveyor, the or each feeler having an end for tracking the exposed surface of an article while it is being transported by the conveyor, which tracking end is adapted to rest on the article and to move the feeler relative to the frame by an amount representative of the position relative to the conveyor of the point on the article to which the tracking end of the feeler is applied,
means for measuring the position of the or each feeler relative to the frame, and
means for calculating the geometry of the articles according to the measured position of the or each feeler.

In particular embodiments of the invention, the system has one or more of the following features:
it includes a set of feelers distributed across the width of the conveyor;
the or each feeler includes a lever articulated to the frame about an axis substantially perpendicular to the direction of forward movement of the conveyor;
said measuring means include, for each feeler, a potentiometer disposed between said feeler and the frame;
said measuring means include a video camera fixed relative to the frame and adapted to observe the movement of a marked region of the or each feeler and image processor means adapted to deduce the position of each feeler from said position of the marked region in the image; and
said marked region is formed by the end of the lever forming a feeler opposite the end for tracking the articles.

The invention also provides an installation for labelling articles, including a conveyor for transporting the articles above which are disposed, in the direction of forward movement of the conveyor, a geometry evaluation system according to any preceding claim and a labelling system including a plurality of labelling heads mobile transversely across the width of the conveyor, the installation further including a central data processor unit adapted to control the position of the labelling heads as a function of the geometry of the articles to be labelled evaluated by the evaluation system.

In particular embodiments of the invention the installation has one or more of the following features:
the labelling system includes means for adjusting the height of the labelling heads relative to the conveyor and at least one member for pressing down the labels, disposed to the rear of the labelling heads relative to the direction of forward movement of the conveyor and adapted to be moved in the heightwise direction with said labelling heads; and
said pressing member is a motor-driven roller whose rotation speed is synchronized with the speed of forward movement of the conveyor.

The invention will be understood better after reading the following description, which is given by way of example only and with reference to the drawings, in which:

FIG. 1 is a diagrammatic view in elevation of an installation including a geometry evaluation system according to the invention;

FIGS. 3 and 4 are diagrammatic views in elevation of the geometry evaluation system at two different stages in the movement of a crate containing fruit past the system; and FIG. 5 is a front view of the feelers of the evaluation system when a crate containing fruit is passing the system.

Figure 2:
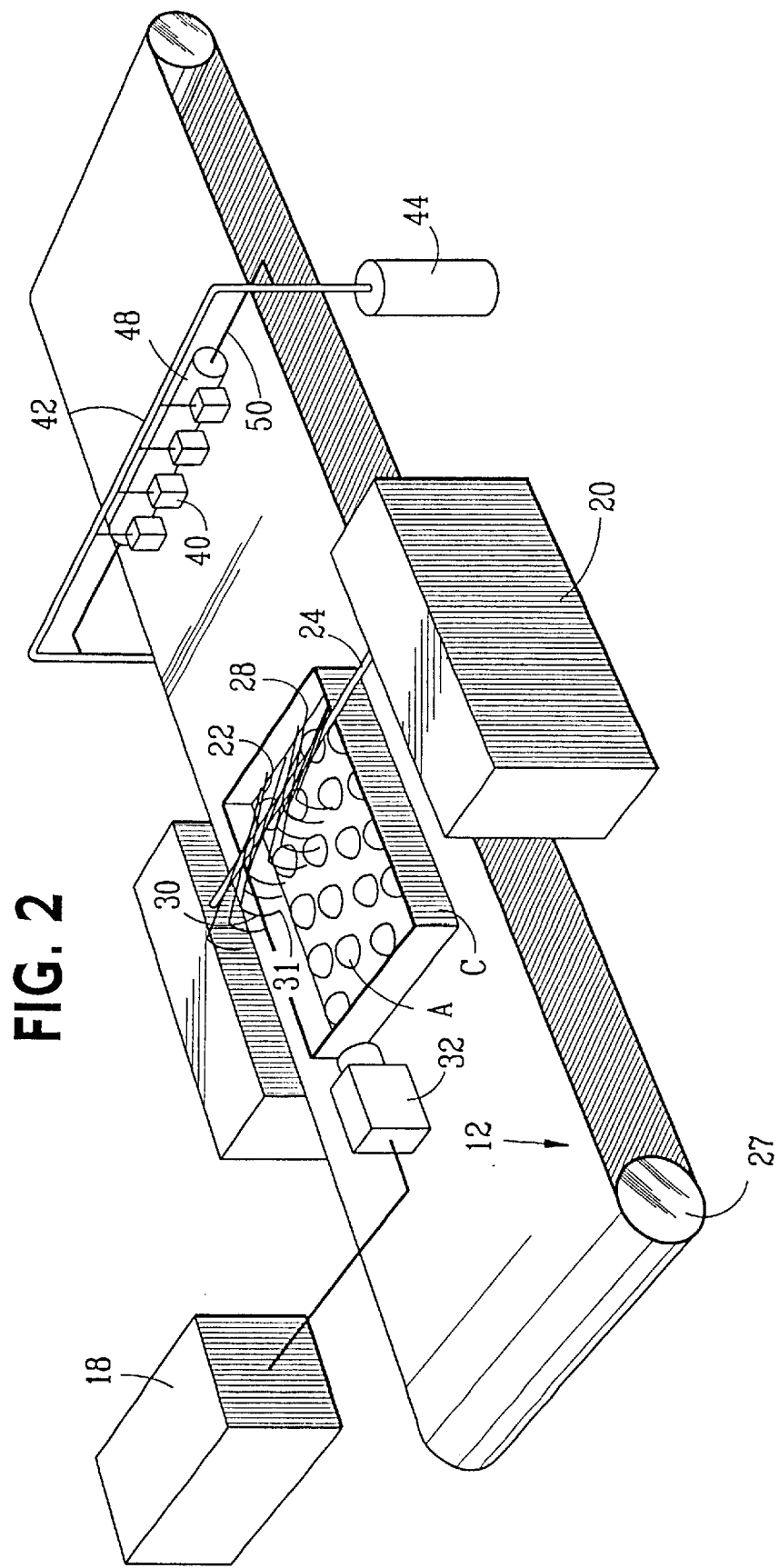
FIG. 2 is a perspective view of the conveyor, the evaluation system and the labelling means.

The installation 10 shown in FIG. 1 is for labelling fruit A placed in crates C. It includes a conveyor 12 for transporting the crates C and over which are disposed in succession, in the direction F of forward movement of the conveyor 12, a system 14 for evaluating the geometry of the articles to be labelled and a system 16 for labelling the articles.

The installation further includes a central data processor unit 18 connected to the evaluation system 14, the labelling system 26 and motor-drive means 27 of the conveyor 12.

As shown also in FIG. 2, the evaluation system 14 includes a frame 20 fastened to the fixed structure of the conveyor. The frame 20 carries a set of mobile feelers 22 distributed transversely across the width of the conveyor 12.

The feelers 22 are formed by levers freely articulated to the frame 20 about an axis 24 above the transport surface of the conveyor and perpendicular to the direction F of forward movement of the articles to be labelled. The levers 22 are identical and are disposed side-by-side across most of the width of the conveyor. For a conveyor 60 cm wide their number is advantageously from 50 to 100. The levers are articulated about the axis 24 independently of each other.

Each lever 22 has a main body 26 in the form of a rectilinear rod. The body 26 of each lever is articulated about the axis 24 in its middle part.

The end of the rod facing the conveyor forms an end 28 for tracking the top surface of the articles to be labelled travelling under the lever and which is adapted to bear on the surface of the articles to be labelled so that the lever is moved when an article passes it, its movement being representative of the position relative to the conveyor of the point of contact of the lever with the article.

At its other end the body 26 is extended by a section forming a beak, the latter consisting of a circular arc centred on the axis 24. Each beak has its end oriented towards the conveyor. The free end 31 of each beak forms a marked region whose movement is representative of the feeler and in particular of its tracking end 28.

The levers are articulated at a point along the length of the body 26 such that the tracking end 28 is biased downwards, i.e. towards the conveyor 12, by its own weight.

The evaluation system 14 further includes a video camera 32 facing the beaks 30. The optical axis X—X of the camera is parallel to the direction F of forward movement of the articles on the conveyor and advantageously passes through the axis 24. The camera 32 is adapted to form an image of all the beaks 30 and in particular of their ends 31.

To facilitate imaging illumination means 34 such as a lamp are disposed to the rear of the beaks 30.

The camera 32 is connected to the central data processor unit 18, which includes image processing means for determining the position of each feeler and calculating the geometry of the articles travelling on the conveyor.

In particular, the image processing means are adapted to determine the curve delimited by the free ends 31 of all of the beaks. From the profile of this curve the article geometry calculating means determine a profile of the cross section of the crate carried by the conveyor and the position of that profile relative to the conveyor. The succession of profiles determined in this way as the crate moves forward determines the topography, relative to the conveyor 12, of the top surface of the crate containing the articles to be labelled.

The labelling system 16 includes a set of labelling heads 40 carried by a gantry 42 extending transversely over the conveyor 12. The height of the gantry 42 is adjustable relative to the conveyor by lifting means such as cylinders 44. The cylinders 44 are connected to and controlled by the central data processor unit 18.

The labelling heads 40 are individually mobile along the gantry 42. Each is associated with its own motor-drive means. The motor-drive means are connected to the central data processor unit 18 for individual adjustment of the position of each labelling head 40.

Thus the position of each labelling head transversely to the direction of forward movement of the products can be adjusted independently.

The gantry 42 also carries a pressure roller 48 which rotates about an axis 50 transverse to the direction of forward movement of the products and parallel to the plane of the conveyor. The roller 48 is rotated by an electric motor whose speed is synchronized to the speed of movement of the conveyor 12. The roller 48 is immediately to the rear of the labelling heads 40 in the direction F of forward movement of the conveyor.

The axis 50 is at a level such that the bottom of the roller 48 is slightly below the level of the labelling heads 40. The roller 48 is advantageously made from elastically deformable foam. It is intended to encourage sticking of labels previously applied to the articles by the labelling-heads.

The installation 10 operates in the following manner.

As shown in FIG. 3, all the feelers are in the same stable rest position if there are no articles on the conveyor. The ends 31 of the feelers are then in a common reference plane containing the optical axis X—X of the video camera 32.

As an article A passes under the tracking end 28 of a feeler 22, the feeler pivots about the axis 24.

Accordingly, the beak 30, and in particular its end 31, is moved a distance representative of the raising of the tracking end 28, as shown in FIG. 4.

Due to its own weight, each lever is at all times either in contact with the top surface of one of the products or in its rest position.

As shown in FIG. 5, when a crate containing a plurality of articles disposed in a column perpendicular to the direction of forward movement of the conveyor passes under them, the feelers 22 pivot through an angle corresponding to the height of the part of the product passing under them.

Accordingly, the ends 31 of the beaks together delimit a profile P corresponding to the reversed profile of the cross section of the crate containing the products in a plane substantially corresponding to the plane containing the ends 28 of the feelers.

The image formed by the video camera 32 shows the profile P. The image is easy for the central data processor unit 18 to analyse because the ends of the beaks 30 are clearly distinguished in the image, in particular because of the light source 34 disposed to their rear.

From a succession of images produced as a crate transported by the conveyor moves forward, and for example at regular, intervals, the central processor unit 18 determines an evaluation of the geometry of the top surface of the articles in the crate.

The central data processor unit 18 controls the movement of the labelling heads 40 and the lifting means 42, allowing for the time interval between the time at which a particular article passes under the tracking ends 28 of the feelers and the time at which the same part of the article passes under a labelling head 42, to position the labelling heads correctly relative to the articles to be labelled.

If the labelling heads are moved in the heightwise direction, the roller 48 is also moved and therefore remains in a satisfactory position for pressing down on previously applied labels to encourage them to stick.

The roller 48 is rotated by the motor at a speed synchronized to that of the conveyor and therefore does not apply to the articles any force in the direction of movement of the conveyor. This prevents all risk of moving the articles in the crates.

In one particular embodiment of the invention the video camera 32 is replaced by a set of potentiometers, each of which is disposed between a feeler and the frame 20. The variation of the resistance of the potentiometer associated with each feeler is representative of the displacement of the feeler. Accordingly, the data processor means 18 can determine the position of each feeler by measuring that resistance.

In a further embodiment of the invention the feelers can slide relative to the frame, instead of being articulated to it. The feelers are held between substantially vertical guides, for example. The feelers are biased towards the conveyor by their own weight.

What is claimed is:

1. A system (14, 18) for evaluating the geometry of articles such as fruit transported by a conveyor (12), characterized in that it includes:

a frame (20) adapted to be mounted facing the conveyor (12), at least one feeler (22) carried by the frame and moved relative to the frame (20) by articles transported by the conveyor (12), the or each feeler (22) having an end (28) for tracking the exposed surface of an article while it is being transported by the conveyor (12), which tracking end (28) is adapted to rest on the article and to move the feeler (22) relative to the frame (20) by an amount representative of the position relative to the conveyor (12) of the point on the article to which the tracking end (28) of the feeler (22) is applied, means (32) for measuring the position of the or each feeler (22) relative to the frame (20), and means (18) for calculating the geometry of the articles according to the measured position of the or each feeler (22).

2. A system according to claim 1, characterized in that it includes a set of feelers (22) distributed across the width of the conveyor (12).

3. A system according to claim 1, characterized in that the or each feeler (22) includes a lever articulated to the frame (20) about an axis (24) substantially perpendicular to the direction of forward movement of the conveyor (12).

4. A system according to claim 1 characterized in that said measuring means include, for each feeler (22), a potentiometer disposed between said feeler (22) and the frame (20).

5. A system according claim 1 characterized in that said measuring means include a video camera (32) fixed relative to the frame (20) and adapted to observe the movement of a marked region (31) of the or each feeler (22) and image processor means (18) adapted to deduce the position of each feeler (22) from said position of the marked region (31) in the image.

6. A system according to claim 5, characterized in that the or each feeler (22) inlcudes a lever articulated to the frame (20) about an axis (24) substantially perpendicular to the direction of forward movement of the conveyor (12); and that said marked region (31) is formed by the end (31) of the lever forming a feeler opposite the end (28) for tracking the articles.

7. A system according to claim 2, characterized in that said measuring means include, for each feeler (22), a potentiometer disposed between said feeler (22) and the frame (20).

8. A system according to claim 2, characterized in that said measuring means include a video camera (32) fixed relative to the frame (20) and adapted to observe the movement of a marked region (31) of the or each feeler (22) and image processor means (18) adapted to deduce the position of each feeler (22) from said position of the marked region (31) in the image.

9. A system according to claim 3, characterized in that said measuring means include, for each feeler (22), a potentiometer disposed between said feeler (22) and the frame (20).

10. A system according to claim 3, characterized in that said measuring means include a video camera (32) fixed relative to the frame (20) and adapted to observe the movement of a marked region (31) of the or each feeler (22) and image processor means (18) adapted to deduce the position of each feeler (22) from said position of the marked region (31) in the image.

11. An installation for labelling articles, including a conveyor (12) for transporting the articles above which are disposed, in the direction of forward movement of the conveyor, a geometry evaluation system (14, 18) according to any of claims 1–6 and a labelling system (16) including a plurality of labelling heads (40) mobile transversely across the width of the conveyor, the installation further including a central data processor unit (18) adapted to control the position of the labelling heads (40) as a function of the geometry of the articles to be labelled evaluated by the evaluation system (14).

12. An installation according to claim 11, characterized in that the labelling system (16) includes means (44) for adjusting the height of the labelling heads (40) relative to the conveyor (12) and at least one member (48) for pressing down the labels, disposed to the rear of the labelling heads (40) relative to the direction of forward movement of the conveyor and adapted to be moved in the heightwise direction with said labelling heads (40).

13. An installation according to claim 12, characterized in that said pressing member is a motordriven roller (48) whose rotation speed is synchronized with the speed of forward movement of the conveyor (12).

* * * * *